United States Patent
Bucknell et al.

(10) Patent No.: US 6,941,755 B2
(45) Date of Patent: Sep. 13, 2005

(54) INTEGRATED BYPASS AND VARIABLE GEOMETRY CONFIGURATION FOR AN EXHAUST GAS TURBOCHARGER

(75) Inventors: John R Bucknell, Royal Oak, MI (US); Ethan Bayer, Lake Orion, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 17 days.

(21) Appl. No.: 10/695,338

(22) Filed: Oct. 28, 2003

(65) Prior Publication Data

US 2005/0086936 A1 Apr. 28, 2005

(51) Int. Cl.[7] ............................ F02D 23/00; F01D 1/02; F01N 5/04; F01N 3/00
(52) U.S. Cl. .................... 60/602; 415/205; 415/151; 60/280; 60/284
(58) Field of Search ....................... 60/602, 280, 284; 415/205, 151

(56) References Cited

U.S. PATENT DOCUMENTS

| | | | | |
|---|---|---|---|---|
| 4,177,006 A | | 12/1979 | Nancarrow | 415/205 |
| 4,214,850 A | | 7/1980 | Sato | |
| 4,244,187 A | * | 1/1981 | Lane et al. | 60/602 |
| 4,389,845 A | * | 6/1983 | Koike | 60/602 |
| 4,404,804 A | * | 9/1983 | Tadokoro et al. | 60/602 |
| 4,490,622 A | | 12/1984 | Osborn | |
| 4,512,714 A | | 4/1985 | Kaesser | 415/205 |
| 4,544,326 A | | 10/1985 | Nishiguchi et al. | 415/205 |
| 4,612,770 A | * | 9/1986 | Tadokoro et al. | 60/602 |
| 4,617,799 A | * | 10/1986 | Todokoro et al. | 60/602 |
| 4,745,753 A | * | 5/1988 | Tadokoro et al. | 60/602 |
| 4,781,528 A | | 11/1988 | Hagita et al. | |
| 4,973,223 A | | 11/1990 | Franklin | |
| 4,982,567 A | * | 1/1991 | Hashimoto et al. | 60/600 |
| 5,046,317 A | | 9/1991 | Satokawa | |
| 5,673,559 A | * | 10/1997 | Benson | 60/602 |
| 6,256,993 B1 | | 7/2001 | Hallimi et al. | |
| 6,263,672 B1 | * | 7/2001 | Roby et al. | 60/605.2 |
| 6,314,735 B1 | * | 11/2001 | Kolmanovsky et al. | 60/602 |
| 6,543,228 B2 | * | 4/2003 | Deacon | 60/602 |
| 6,543,994 B2 | | 4/2003 | Jinnai | |
| 2004/0244373 A1 | * | 12/2004 | Frankenstein et al. | 60/602 |

FOREIGN PATENT DOCUMENTS

| | | | | |
|---|---|---|---|---|
| DE | 3125305 A1 | * | 1/1983 | F01N/3/08 |
| JP | 05209530 A | * | 8/1993 | 60/602 |

* cited by examiner

*Primary Examiner*—Thai-Ba Trieu
(74) *Attorney, Agent, or Firm*—Ralph E. Smith

(57) ABSTRACT

An exhaust gas turbocharger comprising: a twin scroll turbine housing; a turbine wheel positioned in the twin scroll housing; an exhaust gas inlet, operatively connected to port exhaust gas through each side of the twin scroll turbine housing and onto the turbine wheel; a bypass, operatively connected to the exhaust gas inlet to port exhaust gas around the twin scroll turbine housing to bypass the turbine wheel; and a valve, operatively positioned to control exhaust gas flow to each side of the twin scroll turbine housing and the bypass.

5 Claims, 5 Drawing Sheets

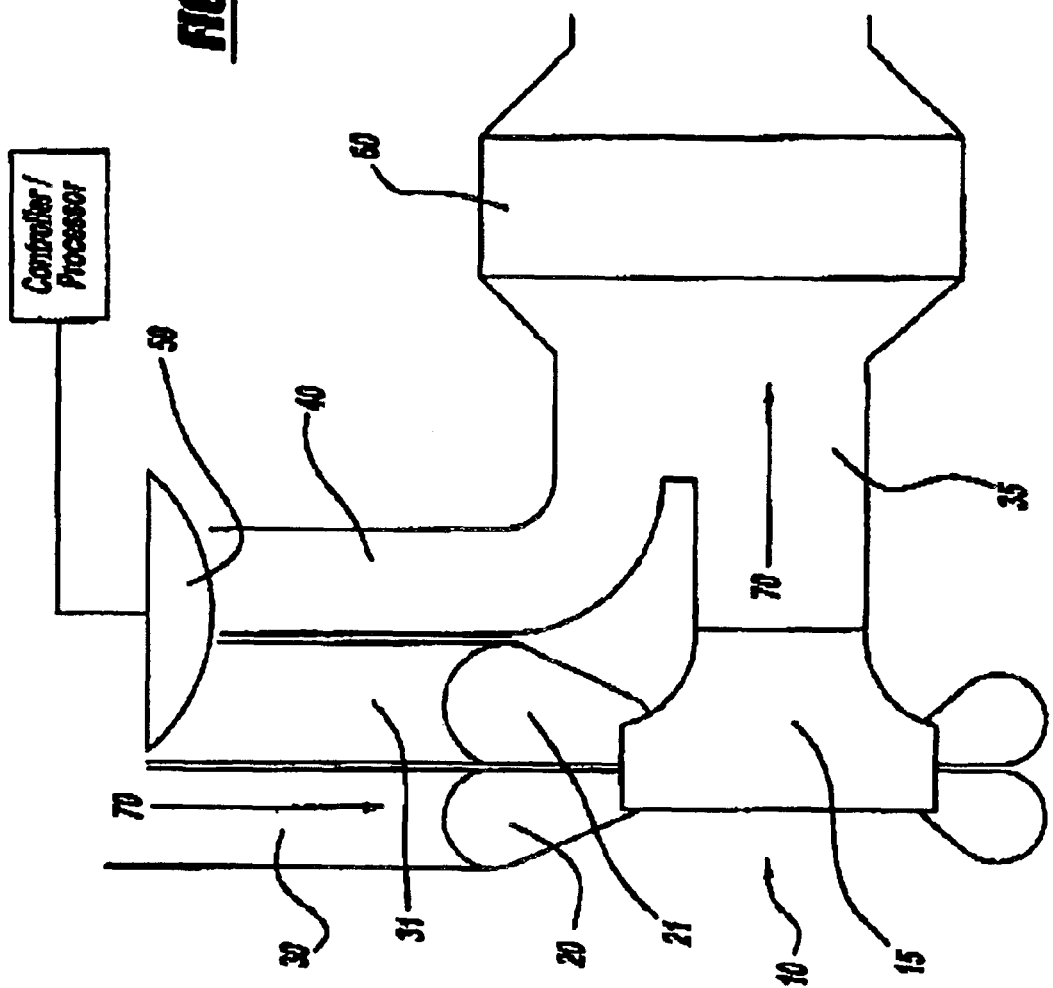

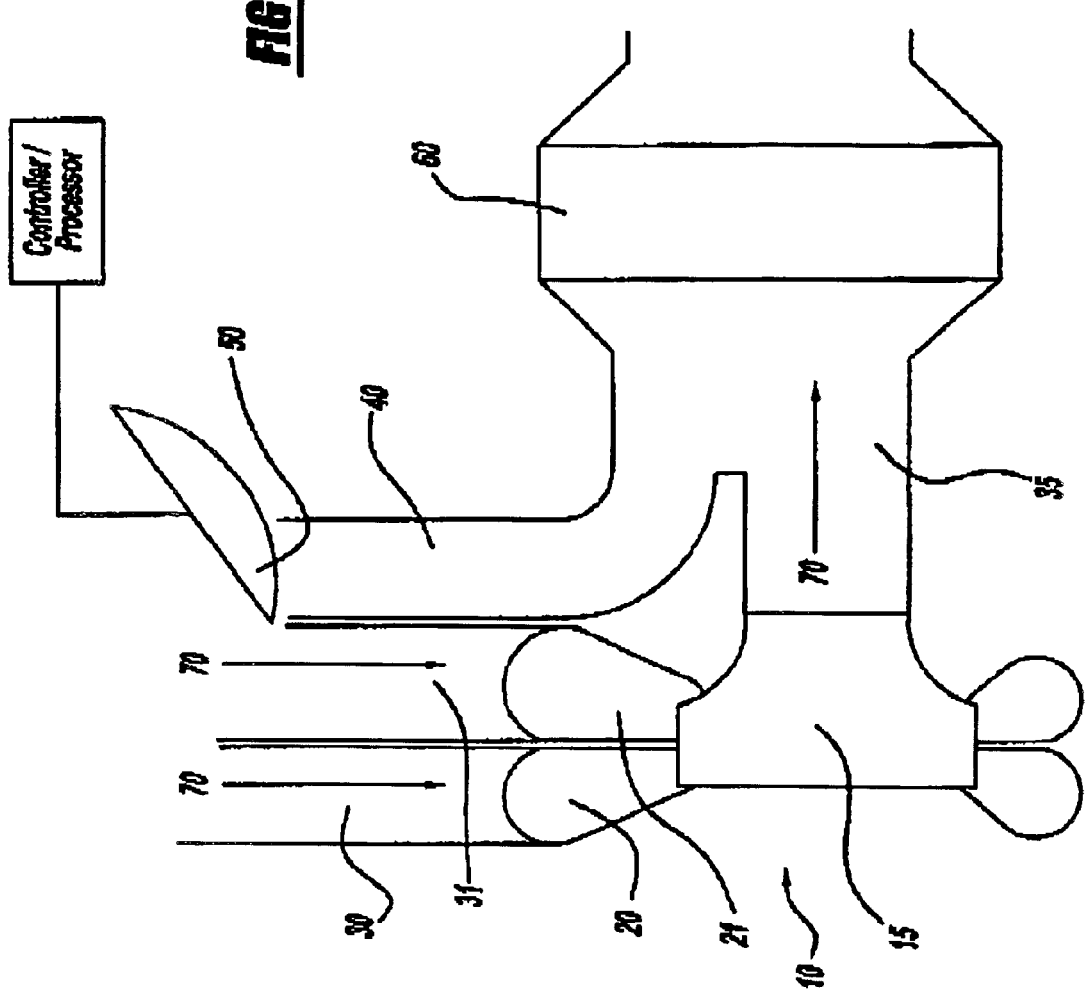

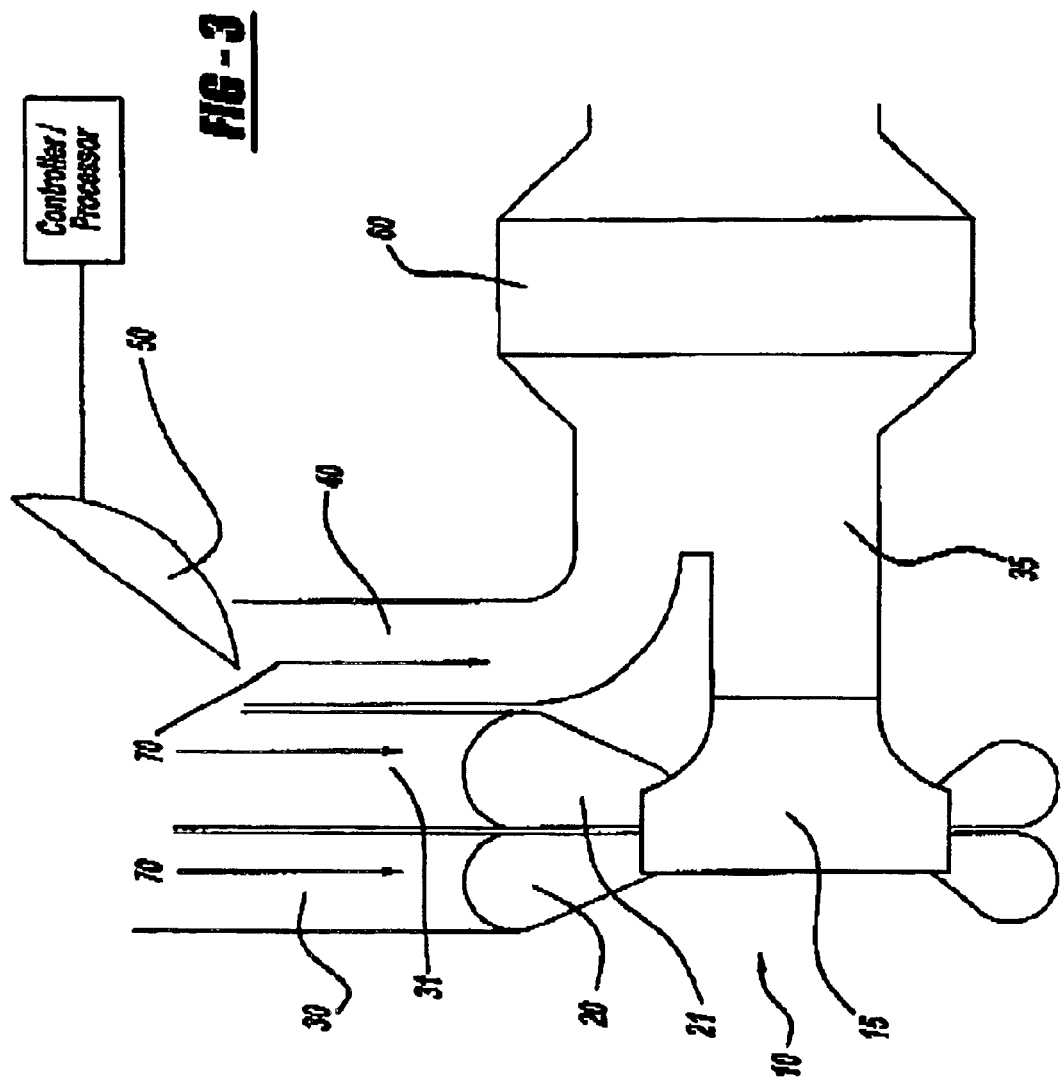

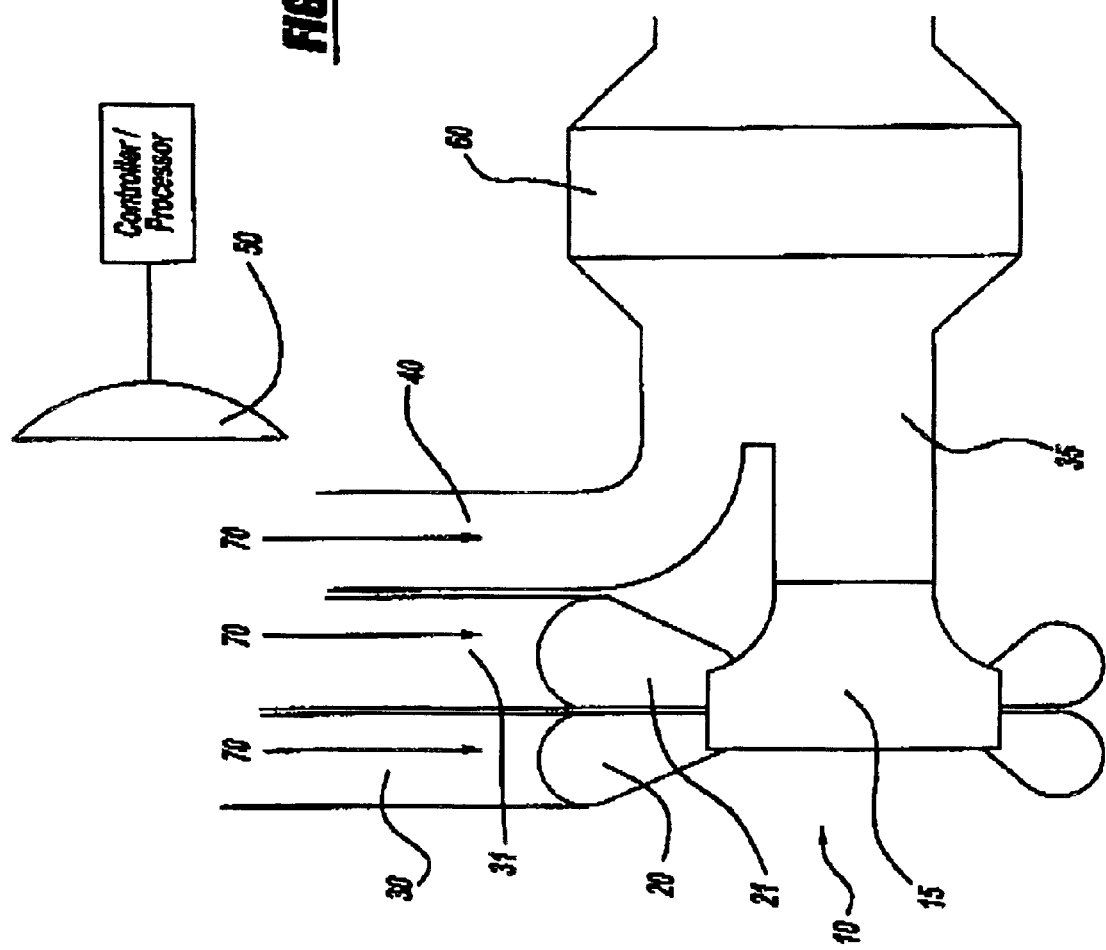

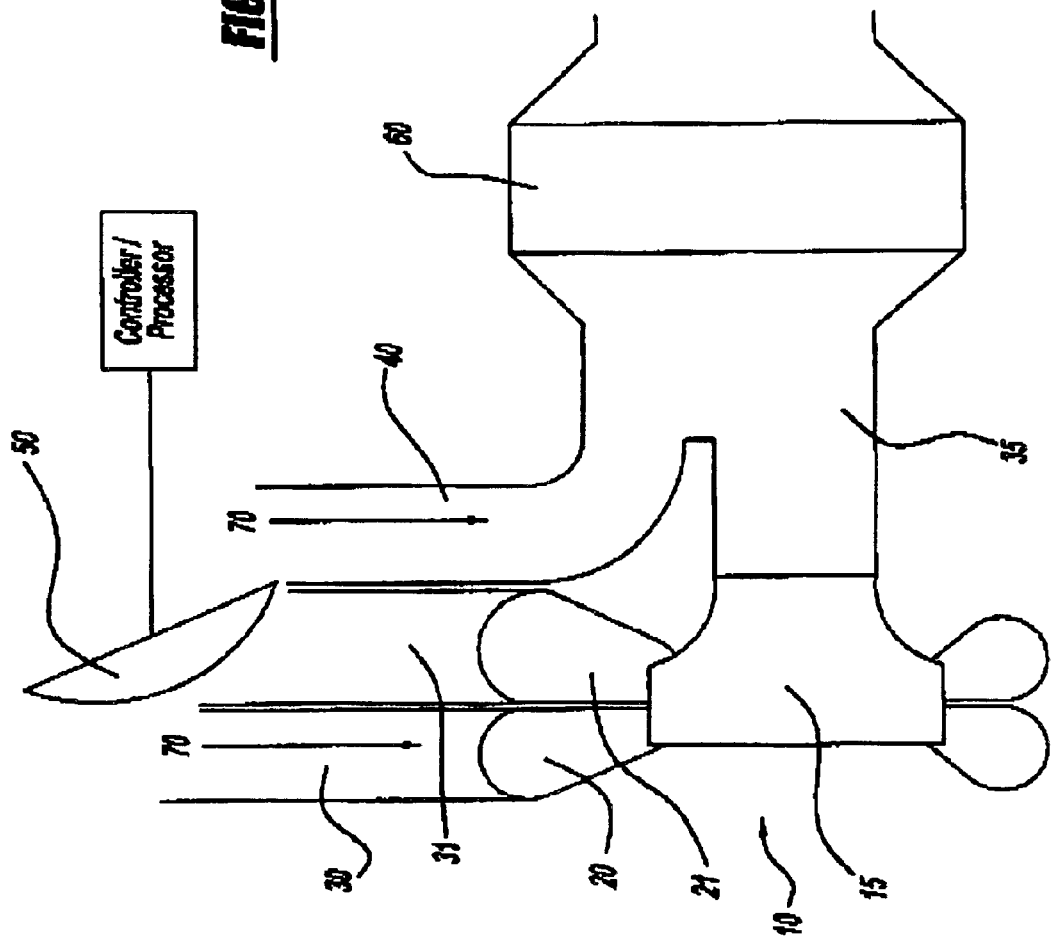

INTEGRATED BYPASS AND VARIABLE GEOMETRY CONFIGURATION FOR AN EXHAUST GAS TURBOCHARGER

FIELD OF THE INVENTION

The present invention generally pertains to an exhaust gas turbocharger having a variable geometry configuration. More particularly, the present invention relates to an exhaust gas turbocharger configured to have a variable geometry and a waste gate that permits the capacity of the turbocharger to be controlled to provide maximum turbo and engine performance throughout the range of engine operation parameters.

BACKGROUND OF THE INVENTION

The term "turbocharging" refers to methods of increasing the air or air/fuel mixture density of a motor vehicle engine by increasing the pressure of the intake air stream prior to its entering the engine cylinder using an air intake compressor powered by the engine exhaust stream. Increasing the density of air in the cylinder is desirable because it represents a relatively simple method of increasing the power generated by the engine.

Turbocharging is a favored method of increasing intake air pressure because current turbocharger designs are very efficient at harvesting the energy in the exhaust stream. This increased efficiency translates into an increase in the engine power output without a significant decrease in fuel economy.

In its basic form, a turbocharger consists of a turbine wheel and a compressor wheel mounted on the same shaft. The turbine wheel and the compressor wheel are each isolated in a housing. A gas inlet and a gas outlet in the turbine housing permit the exhaust stream from the engine to be used to spin the turbine wheel. As the turbine wheel spins, so does the shaft and the compressor wheel which pulls air into the compressor housing where it is pressurized and then directed to the engine intake manifold.

Because the speed of the compressor is dependent on the pressure of the exhaust gas stream, there is generally not enough pressure at the beginning moments of vehicle acceleration, causing turbo "lag" and too much pressure at the final moments. Because most turbochargers are capable of delivering enough pressure at peak engine rpm's to damage the engine and the turbocharger a wastegate is commonly used to vent this extra pressure.

A well known solution to more closely matching the pressure generated by the turbo with engine rpm is a variable geometry turbocharger using a plurality of adjustable vanes or nozzles (referred to herein as a variable nozzle turbocharger). The theory of such turbos is relatively simple: vary the size of the turbine housing, the compressor housing, or both by varying the position of the vanes to permit increased pressure at low engine rpm's and decreased pressure at high engine rpm's.

U.S. Pat. Nos. 4,490,622; 4,973,223; and 6,543,994 describe such variable nozzle turbos having a plurality of nozzle vanes that can be simultaneously moved to change the geometry of turbine housing or the compressor housing. Such variable nozzle turbochargers are commonly used with large diesel engines particularly in commercial truck applications and, more recently, in passenger car applications in combination with common rail, direct injection diesel engines. However, because of the relative complexity of these turbos, they have yet to be successfully adapted for use in the significantly hotter operating environment of gasoline engines.

One engineering solution that offers some of the advantages of variable nozzle turbochargers for a gasoline engine is to use multiple chambers in the turbine housing. A control valve is initially positioned to limit the flow area by closing off chambers to permit the turbocharger to deliver greater initial boost. As engine speed and/or load increases, the control valve is positioned to increases the flow area by opening additional chambers and thus limit the amount of top-end boost.

Examples of turbochargers having multi-chambered turbine housings are found in U.S. Pat. Nos. 4,177,006; 4,512,714; 4,781,528; and 4,544,326. All of these designs focus on the configuration of the turbine housing and/or the kind and operations of the control valve and fall short of describing designs that address the operation of the turbocharger/engine as an entire system. In addition, the described designs do not appear durable enough to deliver sustained, problem free operation when coupled to a gasoline fueled engine. Thus, it would be advantageous to provide an improved design for a variable geometry turbocharger that would consider the turbocharger/engine as a whole system, as well as have a simple and durable design suitable for operation in conjunction with a gasoline engine.

SUMMARY OF THE INVENTION

One object of the present invention is an improved variable geometry turbocharger design that considers the turbocharger/engine as a system.

Another object of the invention is a turbocharger design that is simple, durable, and suitable for operation in conjunction with a gasoline engine.

These and other objects are satisfied by an exhaust gas turbocharger comprising: a twin scroll turbine housing; a turbine wheel positioned in the twin scroll housing; exhaust gas inlets, operatively connected to port exhaust gas through each side of the twin scroll turbine housing and onto the turbine wheel; a bypass, operatively connected to port exhaust gas around the exhaust gas inlets to bypass the turbine wheel; and a valve, operatively positioned to control exhaust gas flow to the exhaust gas inlets and the bypass.

BRIEF DESCRIPTION OF THE DRAWINGS

FIG. 1 is a schematic view of a turbocharger according to the present invention showing exhaust flow to dual turbine inlets and a bypass controlled by a valve that is positioned for low nozzle area and increased gas velocity.

FIG. 2 is the turbocharger of FIG. 1 configured for high nozzle area and reduced pressure loss.

FIG. 3 is the turbocharger of FIG. 2 configured for high nozzle area with further reduced turbine power.

FIG. 4 is the turbocharger of FIG. 1 configured to provide a low resistance path to the catalyst.

FIG. 5 is the turbocharger of FIG. 1 configured to have the shortest path to the catalyst.

DESCRIPTION OF THE INVENTION

A turbocharger of the present invention integrates a variable geometry turbocharger employing a twin scroll turbine housing with a wastegate. Such a turbocharger is simple and inexpensive to manufacture compared to a variable vane turbocharger, is designed to integrate with the engine as a whole permitting increased performance as well as reduced emissions, and is extremely durable and thus can be used in conjunction with gasoline fueled internal combustion engines.

A turbocharger of the present invention comprises a turbine wheel and a compressor wheel mounted on a common shaft where each is surrounded by its own housing. The turbine housing in the present invention is configured to have twin scrolls or chambers where each scroll directs exhaust gas on a distinct region of the turbine wheel. An exhaust gas inlet is operatively connected to these two chambers. In addition, a bypass channel is provided to permit exhaust gas to flow around the exhaust gas inlet of each scroll. A valve is provided to control the flow of exhaust gas. This valve is configured to permit exhaust gas to flow only through one scroll, through both scrolls, through both scrolls and partially through the bypass, through both scrolls and completely through the bypass, and through neither scroll and only through the bypass. Thus, by manipulating the valve position, gas flow through the turbine can be controlled to permit the turbine power to be increased or decreased as desired, or the turbine can be completely bypassed. This configuration permits a high level of control without the complexity of a variable vane mechanism.

Another significant aspect of a turbocharger according to the present invention is the ability to bypass the turbine housing completely during startup in order to direct all the exhaust gas directly to pre-heat the catalyst. Such a holistic approach to the turbo/engine combination permits a significant emission reduction.

Turning now to the Figures where like numbers refer to like parts. FIG. 1 is a schematic of the turbine housing 10 of a turbocharger according to the present invention. This turbocharger has a turbine wheel 15 and twin scrolls 20 and 21 configured to permit exhaust gas 70 to flow onto two regions of the turbine wheel 15. Each scroll 20, 21 has its own exhaust gas inlet 30, 31, operatively connected to the exhaust manifold of the engine. Also present is a bypass 40 that creates a gas passage around the exhaust gas inlets 30, 31 so that gas can flow from the exhaust manifold, completely around the turbine 15, through the catalyst 60 of the catalytic converter and out into the atmosphere. A valve 50 is positioned downstream of the exhaust manifold that controls the flow of the exhaust gas into the exhaust gas inlets 30, 31 and the bypass 40. (While one skilled in the art could choose a number of different types of valves, such as a flapper valve, a barrel valve 50 is preferred.)

FIG. 1 illustrates the valve 50, positioned to block the flow of exhaust gas into one scroll 31 and the bypass 40. This is the optimum positioning of the valve 50 when the car begins to accelerate and the engine rpm's are initially low. This positioning of the valve 50 presents a low nozzle area and delivers increased gas velocity through the inlet 30 thereby spinning the turbocharger up more quickly and reducing turbo lag. This exhaust gas 70 exits the turbo housing through the exhaust gas outlet 35 and then travels through the catalyst 60.

FIG. 2 illustrates the valve 50, positioned to block only the bypass 40, permitting exhaust gas to flow into exhaust inlets 30, 31, into the scrolls 20, 21, and impinge on the turbine 15. This is the optimum positioning as the vehicle is accelerating and the rpm's are approaching 60–80% of the maximum desirable rpm's (redline). When only the bypass 40 is blocked by the valve 50, the turbo is configured for the highest nozzle area and reduced pressure loss.

In FIG. 3, the turbocharger is configured for high nozzle area and reduced turbine power. The valve 50 is positioned to permit some of the exhaust gas 70 to flow through the exhaust gas inlets 30, 31 through the scrolls 20, 21 to drive the turbo 15 before exiting the turbocharger and flowing through the catalyst 60 and a partial flow through the bypass 40. This is the optimum positioning as the vehicle is approaching 80–100% of the maximum desirable rpm's (redline) to provide increased compression, but to prevent over pressurization.

FIG. 4 illustrates positioning of the valve 50 to provide a completely open bypass 40 in addition to exhaust gas inlets 30, 31. With the valve 50 in this position, since the bypass 40 represents the path of least resistance, the bulk of the exhaust gas 70 bypasses the turbine 15 and passes through the catalyst 60. This is the optimum positioning for low engine speed or idle condition where it is desirable to make maximum use of exhaust gas energy to maintain minimum catalyst operating temperature while at the same time maintaining minimum turbine speed for quick turbine response.

FIG. 5 illustrates a particularly unique aspect of the present invention where the valve 50 is positioned to direct nearly all or all of the exhaust gas 70 into the bypass 40. (It should be understood that while the valve 50 is shown in FIG. 5 as being positioned to leave small gaps between the valve 50 and the inlets 30, 31 to the twin scrolls 20, 21, the valve also may be positioned to completely close off the exhaust inlets 30, 31, so that all of the exhaust gas 70 flowing into the turbine housing 10 bypasses the turbine 15 completely.) This positioning completely shuts of compression from the turbo to prevent over pressurization even when the engine is revving beyond its redline.

In addition, the valve 50 can be positioned as in FIG. 5 to seal the exhaust inlets 30, 31 on start-up in order to direct all exhaust gas 70 into the catalytic converter to heat the catalyst 60 quickly. Heating the catalyst 60 to operating temperature permits un-combusted hydrocarbons to be degraded as soon as the vehicle is started and thus significantly improves overall vehicle emissions by eliminating the emission of a large quantity of unburned/partially burned hydrocarbons on start up.

While illustrated as distinct steps in FIGS. 1–5, these Figures represent snapshots of the positioning of the valve 50 during startup (FIG. 5), acceleration, and deceleration. The positioning of the valve 50 is preferably controlled by a vehicle central processing unit or other processing unit based on input from various vehicle sensors such as, but not limited to, speed sensor(s), accelerometer(s), accelerator position sensor(s) and interpolation via appropriate control algorithms to assure seamless operation and integration of the turbocharger and the engine.

In reality, the operation and positioning of the valve 50 covers a continuum that provides for smooth operation and control of the turbocharger described herein. The result is a turbocharger that provides equivalent performance to commonly used variable nozzle turbochargers. However, because of improved design and simplified construction a turbocharger of the present invention is more durable than variable nozzle turbochargers permitting it to be used in conjunction with gasoline fueled engines with the projected life of 100,000 miles.

While specific embodiments of a turbocharger according to the present invention have been disclosed and described herein, alternative embodiments of these and other components of the invention will occur to those of skill in the art. Other obvious variations will be suggested through improvements and new developments of appropriate materials, for example, that can be readily adapted by one skilled in the art. Accordingly, the scope of this invention is to be considered limited only by the following claims.

What is claimed is:

1. An exhaust gas turbocharger comprising:
   a twin scroll turbine housing;
   a turbine wheel positioned in said twin scroll housing;
   at least two exhaust gas inlets operatively connected to port exhaust gas through each side of said twin scroll turbine housing and onto said turbine wheel;
   a bypass operatively connected to port exhaust gas around said at least two exhaust gas inlets to bypass said turbine wheel; and
   a valve operatively positioned to control exhaust gas flow to said at least two exhaust gas inlets and said bypass;
      wherein said valve selectively blocks said at least two exhaust gas inlets on start-up to direct exhaust gas to heat a catalytic converter and said valve blocks one of said at least two exhaust gas inlets during non-start-up conditions.

2. The exhaust gas turbocharger of claim 1, where said valve is a barrel valve.

3. The exhaust gas turbocharger of claim 1, further comprising an electronic controller operationally coupled to position said valve.

4. An exhaust gas turbocharger mounted on a gasoline fueled engine, said exhaust gas turbocharger comprising:
   a twin scroll turbine housing;
   a turbine wheel positioned in said twin scroll housing;
   at least two exhaust gas inlets operatively connected to port exhaust gas through each side of said twin scroll turbine housing and onto said turbine wheel;
   a bypass operatively connected to port exhaust gas around said at least two exhaust gas inlets to bypass said turbine wheel; and
   a valve operatively positioned to control exhaust gas flow to said at least two exhaust gas inlets and said bypass;
   a processor configured to position said valve;
      wherein said valve selectively blocks said at least two exhaust gas inlets on start-up to direct exhaust gas to heat a catalytic converter and said valve blocks one of said at least two exhaust gas inlets during non-start-up conditions.

5. The exhaust gas turbocharger of claim 4, where said valve is a barrel valve.

* * * * *